United States Patent
Appel et al.

(10) Patent No.: US 8,315,425 B2
(45) Date of Patent: Nov. 20, 2012

(54) METHOD FOR COMPARISON OF 3D COMPUTER MODEL AND AS-BUILT SITUATION OF AN INDUSTRIAL PLANT

(75) Inventors: Mirko Appel, Munich (DE); Pierre Georgel, Munich (DE); Ralf Keller, Hallerndorf (DE); Nassir Navab, Munich (DE)

(73) Assignees: Siemens Aktiengesellschaft, Munich (DE); Areva NP GmbH, Erlangen (DE)

( * ) Notice: Subject to any disclaimer, the term of this patent is extended or adjusted under 35 U.S.C. 154(b) by 982 days.

(21) Appl. No.: 12/153,442

(22) Filed: May 19, 2008

(65) Prior Publication Data

US 2009/0010489 A1 Jan. 8, 2009

(30) Foreign Application Priority Data

May 18, 2007 (EP) .................................. 07009962

(51) Int. Cl.
*G06K 9/00* (2006.01)
(52) U.S. Cl. ........ 382/100; 382/190; 382/195; 382/209; 703/1; 706/922; 706/923; 715/964; 700/182
(58) Field of Classification Search ......................... None
See application file for complete search history.

(56) References Cited

U.S. PATENT DOCUMENTS

| | | | |
|---|---|---|---|
| 2001/0025229 A1* | 9/2001 | Moritz et al. ..................... | 703/1 |
| 2003/0012410 A1* | 1/2003 | Navab et al. ..................... | 382/103 |
| 2004/0153295 A1* | 8/2004 | Lohmann et al. ................. | 703/1 |
| 2005/0055181 A1* | 3/2005 | Verdura et al. ................... | 703/1 |
| 2006/0247902 A1* | 11/2006 | Rourke ............................. | 703/1 |

OTHER PUBLICATIONS

Bleser et al., "Real-time 3D Camera Tracking for Industial Augmented Reality Applications, " Jan. 31, 2005, WSCG 2005 conference proceedings; 47-54.*
N. Navab, "Industrial Augmented Reality (IAR): Challenges in Design and Commercialization of Killer Apps", Second IEEE and ACM International Symposium on Mixed and Augmented Reality, Oct. 7-10, 2003; pp. 2-6.
G. Bleser et al., "Real-time 3D Camera Tracking for Industrial Augmented Reality Applications", WSCG International Conference in Central Europe on Computer Graphics Visualization, Jan. 31, 2005; pp. 47-54.
R. Hanek et al., "Yet another Method for Pose Estimation: A Probabilistic Approach using Points, Lines, and Cylinders", 1999 Conference on Computer Vision and Pattern Recognition (CVPR'99), Jun. 1999; pp. 544-550.
Y. Kameda et al., "Outdoor See-Through Vision Utilizing Surveillance Cameras", Third IEEE and ACM International Symposium on Mixed and Augmented Reality, Nov. 2-5, 2004; pp. 151-160.
Y. Genc et al., "Marker-less Tracking for AR: A Learning-Based Approach", International Symposium on Mixed and Augmented Reality, Sep. 30-Oct. 1, 2002; pp. 295-304.
H. Najafi et al., "Automated Initialization for Marker-Less Tracking: A Sensor Fusion Approach", Third IEEE and ACM International Symposium on Mixed and Augmented Reality, Nov. 2-5, 2004; pp. 79-88.

* cited by examiner

*Primary Examiner* — John Lee
(74) *Attorney, Agent, or Firm* — Staas & Halsey LLP

(57) ABSTRACT

A method for carrying out comparison between the as-built state of an industrial plant and the associated CAD planning model, characterized in that the comparison is achieved by superimposition of unreliable components of the CAD model and digital images on the plant, whereby the superimposition is computed without any particular instrumentation within the plant, but only based on selected reliable components from the CAD model, whose physical installations are visible in the images.

13 Claims, 1 Drawing Sheet

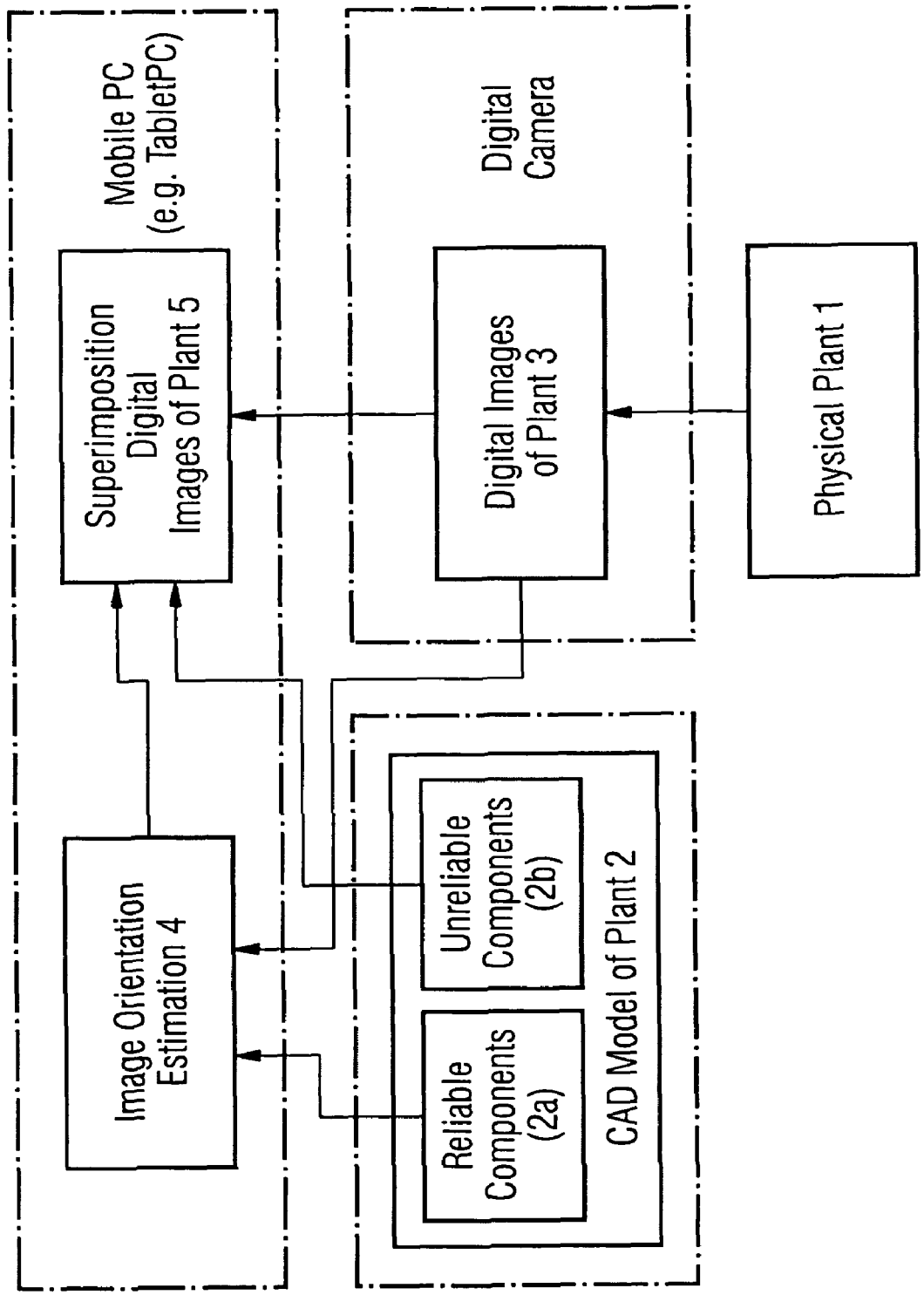

METHOD FOR COMPARISON OF 3D COMPUTER MODEL AND AS-BUILT SITUATION OF AN INDUSTRIAL PLANT

CROSS REFERENCE TO RELATED APPLICATIONS

This application is based on and hereby claims priority to European Application Number EP07009962, filed on May 18, 2007, the contents of which are hereby incorporated by reference.

The invention relates to a method for comparing the 3D computer model of an industrial plant, which was for example designed during planning of the plant, or during planning of service activities, with the physical installation after erection.

The planning of industrial plants is nowadays widely based on Computer Aided Design (CAD). Therefore, a 3D CAD-model of most structures and components of a plant is available, representing the design state. However, during the erection of the physical plant, usually minor and major deviations from the original plant design occur, e.g. components and/or structures are shifted, components are missing, etc.

For reasons of approval, documentation, technical inspections, etc., a precise knowledge and documentation of the as-built condition of a plant is crucial.

Furthermore, in many cases the planning and preparation of plant service activities are preferably carried out based on a 3D CAD model, which accurately represents the as-built condition of the physical plant.

The effort for identification of discrepancies between a CAD model and the associated realized physical plant is quite high. Depending on the scope and approach of the examination, the effort ranges from sparse manual measurements to a complete re-modelling of the plant, e.g. based on Photogrammetry or Laser-Scanning.

In the past, the problem of as-built comparison has been solved using various means, depending on scope and approach of the examination:

1. Manual Measurements: Tape measurements or measurements by laser distance measurement devices; measures are entered manually in the CAD model to compare with the planning 3D data. Alternatively, the measurements can also be compared with 2D technical drawings resulting from the CAD data.
2. Laser Scanning: Laser Scanning Methods, resulting in millions of single 3D points, so called point clouds, are used to capture the areas of interest in a plant. The entirety of all 3D points represents the as-built state of the area. The point clouds are used to compare with the planning 3D model, e.g. by engineering an 3D as-built model by fitting plant components into the point clouds, by measuring distances within the point clouds and comparing with the associated distances in the CAD model, or by directly integrating the point cloud in the CAD model and identify discrepancies between the two data sets.
3. Photogrammetry: Using photogrammetric methods, i.e. taking images of the areas of interest, image orientation (estimation of camera position and direction of view, usually based on partially calibrated optical markers distributed within the areas of interest), measurements within the images and possibly 3D reconstruction of plant components.
4. Marker Based Superimposition: Optical markers are distributed and calibrated within the areas of interest in a plant. The markers are then used for image orientation, estimation of camera position and direction of view, and superimposition of the 3D CAD model on the images.

The method described in 4. considers distribution and calibration of optical markers, which is a major effort. The obligate using of markers is disadvantageous as it makes a method complex.

The authors already hold the following patents in the field of 3D reconstruction, as-built comparison, and industrial augmented reality:

Appel, M.; Navab, N.
Three-dimensional image reconstructing method, involves generating co-registered orthographic and perspective image from set of calibrated images, and reconstructing image from generated images
PN: US2003137508-A1
Bani-Hashemi A; Fridrich W; Moritz S; Craft N; Friedrich W; Navab N; Sauer F
Arrangement for generating virtual industrial system model compares system component information with real system image data to identify components in image data
WO200002162-A1
Comaniciu D; Genc Y; Navab N; Ramesh V
Camera pose determination for augmented reality applications, involves using external tracking system to estimate pose by extracting object features and constructing object model to eliminate further use of tracking system
PN: US2003012410-A1

An object of the invention is to provide a method enhancing the superimposition, especially the image orientation, for examination of plants.

The invention is scoped according the combination of claim 1. Advantageous arrangements are included in the sub claims.

The invention allows superimposition of a CAD model on images for the purpose of comparison without any particular instrumentation, e.g. optical markers, within the plant. A major bottleneck for the computation of the superimposition is the image orientation, i.e. the estimation of the camera position and direction of view while taking the image. As the CAD model itself is subject to examination, it can normally not be used to support image orientation. However, the categorization of the CAD model into unreliable and reliable components as described in this invention allows utilizing the CAD model for the image orientation process.

However, using markers, which is a major effort, is not required by a method according the present invention.

Another object of this invention is to lower the effort for the identification of discrepancies between a CAD model and the as-built condition of the associated physical plant.

The invented method comprises the following steps in details:

1. Categorization and appropriate specification of CAD-model components. There are two categories: 1. Components, which are reliable, i.e. it is known that their shape, their position, and their alignment are correctly built in the physical plant. These components will serve in the following steps as an infrastructure for the orientation of images; we therefore call them "Natural Landmarks". 2. Components which are unreliable, i.e. their shape, position, and alignment in the physical plant are not known. The as-built state of these components is subject to examination.
2. Acquisition of digital still images of the plant covering those areas, where discrepancies between CAD and as-built shall be identified. The images must contain one or several physical installations of the Natural Landmark objects categorized in the CAD model as reliable in step 1.
3. Distortion correction of the images based on the camera's known internal parameters, like focal length, shift of optical center, aspect ratio etc.

4. Detection of Natural Landmarks in the images and establishing appropriate 2D-3D correspondences between the detected 2D landmarks and the associated reliable 3D objects in the CAD model.
5. Computation of the images' orientations, camera position and direction of view, based on the 2D-3D correspondences established in step 4 and the camera's known internal parameters.
6. Visualization of the superimposition of CAD components to be reviewed and the associated digital images which show the physical installations of these CAD components. The superimposition is based on the image orientation estimation in step 5).
7. Depending on the degree of congruence between the superimposed model component and its image, the as-built state of the component is satisfactory. If it is not, further measures have to be initiated to quantify the deviation, shown in 8.
8. Should there be deviations between the 3D CAD model and the as-built state, i.e. the as-built state is not satisfactory, the image orientation results of step 5 can be used for photogrammetric application, i.e. to extract metric information from at least two images and to compare this information with the 3D CAD model.

Following this procedure, components previously marked as unreliable in the CAD model, change their status to "reliable" in case the superimposition shows their correct installation. Therefore, more natural landmarks become available for further superimposition.

Now the invention is described taking reference to the accompanied FIGURE:

The FIGURE shows a preferred embodiment/example of the invention.

Within the planning CAD model 2, components are separated by reliable components 2a, whose shape, position and alignment within the plant are known to be as planned, and unreliable components 2b, whose realization are subject to examination. The digital images of the plant 3 are evaluated in the image orientation estimation 4, such that the physical realization of the reliable components are identified, located, and set into correspondence to the associated CAD model components in 2a. Based on the correspondence information and on the known 3D information of 2a, the image orientation, i.e. the camera positions and directions of view while taking the images, are estimated in image orientation estimation 4. The result is used in superimposition digital images of plant 5 for the correct positional arrangement of the superimposition of image 3 and unreliable components 2b within superimposition digital images of plant 5.

Physical Plant 1: Physical installation of parts of an industrial plant and or an entire industrial plant CAD Model of Plant 2: 3D Computer model of an industrial plant, as it is used for Computer Aided Design (CAD). Typically, such a model contains the geometrical appearance of structures and components of the plant, as well as associated attributes such as material, ID-numbers, installation information, etc. The information whether a component is "reliable" (2a) i.e. the physical realization of a component is as defined in the CAD model, or "unreliable" (2b), i.e. it is not known whether the physical realization of a component corresponds to the definition in the CAD model, can for example be stored within an attribute. Typically, CAD systems containing such models are installed on computer systems within the engineering department of a plant construction or plant service company.

Digital images of plant 3: The digital images of the plant are taken with a digital camera.

Image Orientation Estimation 4: The method for image orientation is typically realized within a computer-software. Given the input of the reliable components of the plant 2a and the digital images of the plant 3, the method estimates the positions and directions of the camera while taking the images.

Superimposition of Digital Images of Plant 5: This module visualizes the superimposition results. For example, it visualizes certain components of the CAD model 2 and superimposes a semi transparent image in correct positional arrangement, such that the digital image and the CAD model can be observed in the same geometrical context.

Typically, module 4 and 5 are realized within one common computer software. The software can for example be run a mobile computer system, such that the visualization of superimposition can be done on-site in an industrial plant. Alternatively, one can also only take digital images on-site and send them electronically to the engineering department of a company, who then evaluates the images by utilizing modules 4 and 5.

The invention claimed is:

1. A method for comparing an as-built state of an industrial plant and an associated three-dimensional computer aided design (3D CAD) model of the industrial plant, comprising:
    separating components of the industrial plant into reliable components and unreliable components;
    obtaining digital images of the unreliable components in the as-built state of the industrial plant;
    superimposing the digital images of the industrial plant on the 3D CAD model of the industrial plant;
    for the unreliable components, comparing the as-built state of the industrial plant with the associated 3D CAD model, based on the digital images superimposed on the 3D CAD model; and
    for only the reliable components having physical installations visible in the digital images, comparing the as-built state of the industrial plant with the associated 3D CAD model, based on the digital images superimposed on the 3D CAD model.

2. The method according to claim 1,
    wherein each component in the 3D CAD model is categorized as either reliable or unreliable, depending on whether the component has a physical shape, position, and alignment, which is known in the as-built state of the industrial plant and, if known, whether the physical shape, position, and alignment in the as-built state of the industrial plant are the same as the physical shape, position, and alignment in the 3D CAD model.

3. The method according to claim 1,
    further comprising performing an Image Orientation Estimation to align the digital images with the 3D CAD model, wherein the Image Orientation Estimation is based on positions of the reliable components as determined with a 2D feature detection in the digital images.

4. The method according to claim 1,
    further comprising performing an Image Orientation Estimation to align the digital images with the 3D CAD model, wherein the Image Orientation Estimation is based on positions of the reliable components and an automatic establishment of a correspondence between 2D detection results in the digital images and the positions of the reliable components in the 3D CAD model.

5. The method according to claim 1,
    further comprising performing an Image Orientation Estimation to align the digital images with the 3D CAD model, wherein the digital images are augmented by the unreliable components of the 3D CAD model, whereby superimposition is based on the Image Orientation Estimation.

6. The method according to claim 1, wherein in performing superimposition, reliable components are used for alignment, a first superimposition produces intermediate results, a portion of the unreliable components are re-categorized as reliable components based on the intermediate results, and a second superimposition is performed with alignment based also on the components that were re-categorized as reliable components.

7. The method according to claim 1, wherein discrepancies between the 3D CAD model and the as-built state of the industrial plant are determined by a photogrammetric method, using at least two superimposed images, which show the same scene from different angles and positions.

8. The method according to claim 1, wherein for at least some of the reliable components, no digital image is superimposed on the 3D CAD model.

9. The method according to claim 1, wherein the method is performed without requiring optical markers to be physically placed throughout the plant for estimation of camera position and direction of view.

10. The method according to claim 1, wherein the method is performed without requiring optical markers to be physically placed in the plant.

11. The method according to claim 2, further comprising performing an Image Orientation Estimation to align the digital images with the 3D CAD model, wherein the Image Orientation Estimation is based on positions of the reliable components as determined with a 2D feature detection in the digital images.

12. The method according to claim 11, wherein the Image Orientation Estimation is based on positions of the reliable components and an automatic establishment of a correspondence between 2D detection results in the digital images and the positions of the reliable components in the 3D CAD model.

13. The method according to claim 12, wherein the digital images are augmented by the unreliable components of the 3D CAD model, whereby superimposition is based on the Image Orientation Estimation.

* * * * *